United States Patent
Bader et al.

(10) Patent No.: US 11,724,667 B2
(45) Date of Patent: Aug. 15, 2023

(54) MOTOR VEHICLE AND METHOD FOR PROCESSING SOUND FROM OUTSIDE THE MOTOR VEHICLE

(71) Applicant: DAIMLER AG, Stuttgart (DE)

(72) Inventors: Klaus Bader, Oberdischingen (DE); Laura Bader, Oberdischingen (DE); Hannah Kniesel, Ulm (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 332 days.

(21) Appl. No.: 17/279,170

(22) PCT Filed: Sep. 10, 2019

(86) PCT No.: PCT/EP2019/074138
§ 371 (c)(1),
(2) Date: Mar. 24, 2021

(87) PCT Pub. No.: WO2020/064327
PCT Pub. Date: Apr. 2, 2020

(65) Prior Publication Data
US 2021/0394716 A1   Dec. 23, 2021

(30) Foreign Application Priority Data
Sep. 25, 2018   (DE) .................. 10 2018 007 582.7

(51) Int. Cl.
*B60R 25/31* (2013.01)
*B60R 25/01* (2013.01)
(Continued)

(52) U.S. Cl.
CPC .............. *B60R 25/31* (2013.01); *B60R 25/01* (2013.01); *B60R 25/24* (2013.01); *G10L 15/22* (2013.01);
(Continued)

(58) Field of Classification Search
CPC ......... B60R 25/31; B60R 25/01; B60R 25/24; B60R 25/25; G06F 3/167; G10L 15/22;
(Continued)

(56) References Cited

U.S. PATENT DOCUMENTS

| 2016/0165031 A1* | 6/2016 | Gopinath | H04W 8/005 |
| | | | 455/569.2 |
| 2018/0070291 A1* | 3/2018 | Breaux | B60K 35/00 |

FOREIGN PATENT DOCUMENTS

| CA | 2727846 C | 12/2009 |
| DE | 102016209991 A1 * | 12/2017 |

(Continued)

OTHER PUBLICATIONS

International Search Report dated Jan. 7, 2020 in related/corresponding International Application No. PCT/EP2019/074138.

(Continued)

*Primary Examiner* — Yogeshkumar Patel
(74) *Attorney, Agent, or Firm* — Patent Portfolio Builders PLLC

(57) ABSTRACT

A motor vehicle has a component for recognizing a user based on a mobile device carried by the user and a microphone. Once a user has been recognized from the outside, the microphone converts sound waves acting on the motor vehicle into electrical signals. A speech control unit processes the sound waves transmitted by the microphone. The motor vehicle includes a number of microphones oriented in different directions on different sides of the motor vehicle. The number of microphones convert sound waves into electrical signals and transmit them to the speech control unit. The speech control unit is connected to a plurality of loudspeakers directed towards the surroundings of the vehicle for voice communication with the user, with speech output being provided only via the loudspeaker or loudspeakers closest to the user.

15 Claims, 2 Drawing Sheets

Figure 1:
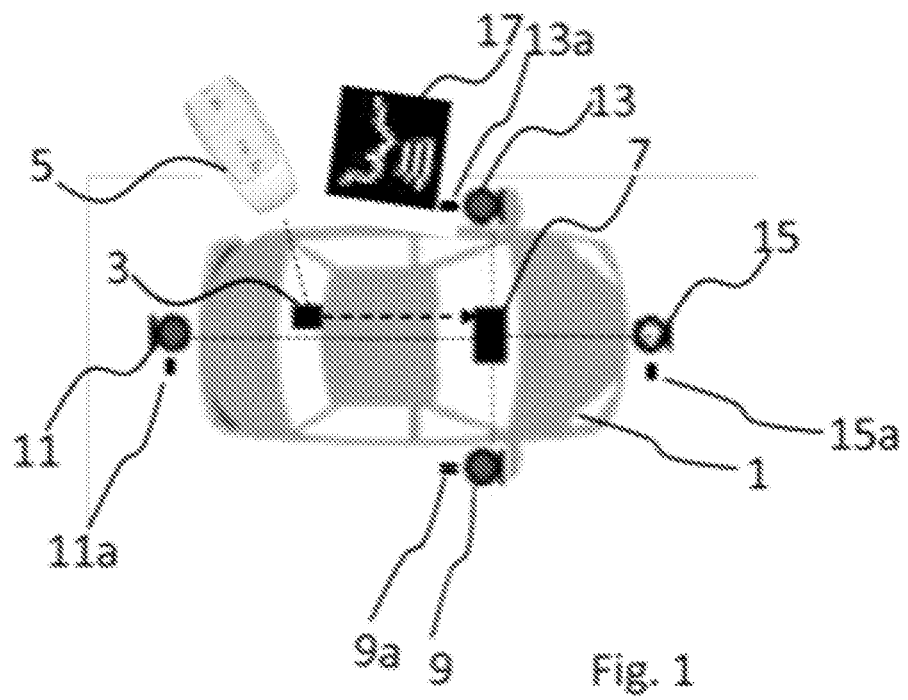

(51) Int. Cl.
   *B60R 25/24*    (2013.01)
   *G10L 15/22*    (2006.01)
   *H04R 1/40*     (2006.01)
   *H04R 3/00*     (2006.01)

(52) U.S. Cl.
   CPC ............. *H04R 1/403* (2013.01); *H04R 1/406* (2013.01); *H04R 3/005* (2013.01)

(58) Field of Classification Search
   CPC ........ H04R 1/403; H04R 1/406; H04R 3/005; H04R 5/04; H04R 2499/13
   See application file for complete search history.

(56) References Cited

FOREIGN PATENT DOCUMENTS

| | | |
|---|---|---|
| DE | 102016209991 A1 | 12/2017 |
| DE | 102017218542 A1 | 8/2018 |
| DE | 102017219234 A1 | 5/2019 |
| EP | 1884421 A1 | 2/2008 |
| EP | 1908640 A1 | 4/2008 |
| EP | 1884421 B1 * 10/2008 ........... B60R 25/257 |

OTHER PUBLICATIONS

Office Action created on Jun. 7, 2019 in related/corresponding DE Application No. 10 2018 007 582.7.
Written Opinion dated Jan. 7, 2020 in related/corresponding International Application No. PCT/EP2019/074138.

* cited by examiner

MOTOR VEHICLE AND METHOD FOR PROCESSING SOUND FROM OUTSIDE THE MOTOR VEHICLE

BACKGROUND AND SUMMARY OF THE INVENTION

Exemplary embodiments of invention relate to a motor vehicle designed to process sound from outside the motor vehicle and associated method.

Document DE102016209991A1 describes a device for operating a vehicle component by means of speech input. A user approaching the vehicle is recognized by means of a mobile device that he carries, such as a key. The device also comprises a sensor to detect a gesture and/or speech input. The speech input is detected by a microphone, which converts sound waves caused by the speech input into electrical signals and transmits them to a speech control unit for evaluation.

Laid-open publication DE 10 2017 219 234 A1 discloses a method and a motor vehicle with a microphone arrangement for detecting a speech input outside the vehicle. A detection device recognizes a user by means of a user device that he carries, and the microphone arrangement uses beamforming to determine a directional signal of the speech input. The microphones closest to the user are selected on the basis of the directional signal.

Laid-open publication EP 1 884 421 A1 describes a method and a device with an arrangement for recognizing and determining the position of a vehicle user. Furthermore, the arrangement comprises a speech control unit with microphones directed into the vehicle environment for recognizing and implementing a speech command.

The disadvantage is that responses to speech input are not directed towards the user and are therefore difficult to understand in many situations.

Exemplary embodiments of the invention, on the other hand, are directed to a motor vehicle and a method that enable the vehicle to communicate better with the user.

The motor vehicle according to the invention has a plurality of microphones oriented in different directions and arranged on different sides, which convert sound waves into signals and transmit them to the speech control unit for evaluation. By using a plurality of microphones that are aligned in such a way that the sound can be easily detected from each side of the vehicle, the sound acting on the microphones can be better evaluated since one of the microphones is always largely facing a sound source or a speaking user and provides a clear signal. Based on the detected speech signal, functions in the vehicle are reliably controlled. For example, actuators can be activated to open a door, a luggage compartment opening, a vehicle window, a sunroof, etc. The speech control unit determines a position of a user identified by the mobile device based on differences in the propagation time of electrical signals caused by a speech input. If, for example, the microphones are located on four sides of a motor vehicle, i.e., on the front side, back side and on the two lateral sides, the system enables a user's position relative to the vehicle to be determined. The position of the user from which the speech input is made is determined from the time difference between the sound signals arriving at the various microphones and caused by the speech input. According to the invention, the speech control unit is connected to a plurality of loudspeakers directed into the vehicle environment for communication with the user, with only the loudspeaker or loudspeakers closest to the user being activatable for speech output. In the case of a user standing in front of a loudspeaker, this loudspeaker represents the closest one, since the distance to the other loudspeakers is significantly greater and the differences in distance exceed a predetermined tolerance. If the user is in a position between two loudspeakers and the differences in distance to both loudspeakers are within the predetermined tolerance, then the two loudspeakers shall be referred to as the closest ones. In a further modification, the volume of the loudspeaker is changed depending on the distance of the user position. If the user's position is further away from the vehicle, a loudspeaker output is output with higher volume and/or intensity compared to a user positioned closer to the vehicle. It is advantageous if the volume can be adjusted in order to ensure that the speech output can be reliably understood, while at the same time avoiding unnecessary noise pollution of the surroundings. Furthermore, according to the invention, the volume and/or frequency of the speech output is adjusted depending on the ambient noise. In the case of a motor vehicle parked on a busy road with high ambient noise levels, the speech control unit produces an information output at a higher volume or sound pressure level than a vehicle parked overnight in a quiet residential area, for example. In addition, the frequency of the speech output can be changed in such a way that it stands out from ambient noise and is therefore particularly easy to understand. The frequency of the speech output is increased in relation to low-frequency ambient noise and decreased in relation to higher-frequency ambient noise. The volume, sound pressure level and frequency of the ambient sound signals detected by the vehicle's microphones are determined by the speech control unit connected to the microphones.

In a further embodiment, the speech control unit determines whether the sound acting on the microphones can be assigned to a user's speech input. By evaluating energy levels and speech characteristics, the speech control unit determines whether the sound is a speech input. This is an advantageous way of detecting sounds such as traffic noise, door slamming, etc. and excluding them from further evaluation. In addition to reducing the computing load of the speech control unit, a suppression of interfering noise allows misinterpretation, causing an unintentional activation of an actuator.

In a modified embodiment, the speech control unit recognizes a command transmitted by speech input and executes a vehicle function in the context of the user's location. For example, a speech command "open door" is determined in the context of the user's location or position relative to the vehicle. If the user is standing in front of the driver's door, then only this door is opened by activating an actuator; correspondingly, if the user is standing in front of the passenger door or in front of the luggage compartment, only this door is opened. Similarly, windows or other components can also be opened or closed according to this logic. A vehicle function effected by a speech command is executed relative to the vehicle depending on the location of the user issuing the speech command, i.e., where a component is referred to by an indication within the speech command, the vehicle function is executed at a component of this kind closest to the user.

In a further embodiment, after determining the location of a user, the speech control unit only evaluates signals from a microphone closest to the user, and the signals from the other microphones are not taken into account by not evaluating them or by switching off or passively switching the channels of the speech control unit to these microphones. It is advantageous to switch over to one microphone after the user's position has been determined so that reverberation effects or other mutual interference between the microphones is prevented. Alternatively, or additionally, after the user's position has been determined, only loudspeakers closest to the user are activated for speech output to the user, depending on the user's location. The speech output is, for example, accompanied by a message indicating that the user is ready to receive commands or indicating a request for a new speech input because the original one was not understood. The use of the loudspeaker closest to the user reduces the acoustic disturbance of the environment in a beneficial way.

In a modified embodiment, the speech control unit checks whether the sound of a speech input corresponds to a stored voice pattern. The stored voice pattern corresponds, for example, to that of a vehicle user, which was determined in a previous set-up procedure and stored in the speech control unit. By means of the stored voice pattern, it can be determined whether a user of the device recognized by the key has a more extensive authorization, confirmed by matching his voice with the stored voice pattern. For example, a child carrying the vehicle key is recognized in an advantageous way, but due to the fact that the child's voice does not match a voice pattern stored in the speech control unit with a speech input, the child cannot control vehicle functions.

In a further embodiment of the invention, the speech control unit boots up from an idle state to an operational state upon recognition of a user by a mobile device, so that electrical signals generated by the microphone can be evaluated. As soon as the means for recognizing a user by means of a carried device have recognized the user, the speech control unit boots up. For example, antennas located in the vehicle recognize a mobile device in the form of a key or a smartphone. Alternatively, a signal sent by means of a radio key to open the vehicle leads to the recognition of the user. As soon as a user is recognized, the speech control unit receives information from the means for recognizing a user, such as a locking control unit, and the speech control unit then boots up from a passive mode, such as a sleep mode, to an operational state. When a state of operational readiness has been reached, an acoustic or optical signal is emitted to the user, for example by flashing of a lighting device. The user can also or alternatively be informed about the operational readiness of the speech control system by a moving of components, for example by a folding of the mirrors in or out. As soon as the speech control system is ready for operation, a user can operate vehicle components from outside the vehicle by speech. The speech control system is only operational when a user is nearby, thus reducing the vehicle's standby power consumption. When a vehicle engine is started, the speech control system returns to an idle mode, so that the vehicle can no longer be controlled from the outside for safety reasons. The vehicle has its own speech control unit to process speech input from outside, independent of any speech input system already present in the passenger compartment, for example in a head unit. The speech control unit can thus be optimally designed for speech input from outside without having to deal with restrictions of the speech input system designed for the interior. The speech control unit must be able to boot up quickly from an idle state to an operating state, must not be able to be switched off completely and must consume little power in the idle state.

In a further embodiment, the microphones are arranged in the front, rear and both side areas. The microphone arrangement, in an advantageous way, makes it possible to determine the position of a user within a 360 degree radius of the vehicle.

In a further embodiment, the microphones arranged in the side areas are arranged in the side mirrors. The side mirrors provide an installation space protected from weather conditions for the arrangement of the microphones. At the same time, the position of the mirrors, elevated from the vehicle contour, ensures good reception of sound waves from the microphones, especially those caused by speech.

In the method according to the invention for processing sound from outside a vehicle, a plurality of microphones arranged on different sides of the motor vehicle are evaluated. The vehicle can be reliably operated from any position around the vehicle in an advantageous manner. According to the invention, a voice communication with the user is carried out via a plurality of loudspeakers directed into the vehicle environment and connected to the speech control unit, wherein, for a speech output, only the loudspeaker or loudspeakers closest to the user are activated.

Further advantages, features and details will become clear from the following description, in which at least one embodiment is described in detail—if necessary with reference to the drawing. Described features and/or features shown in the drawings may, on their own or in any feasible combination, constitute the subject matter of the invention, where appropriate also independently of the claims, and may in particular also be the subject of one or more separate applications. Like, similar and/or functionally like parts are provided with like reference signs.

BRIEF DESCRIPTION OF THE DRAWING FIGURES

Figure 2:
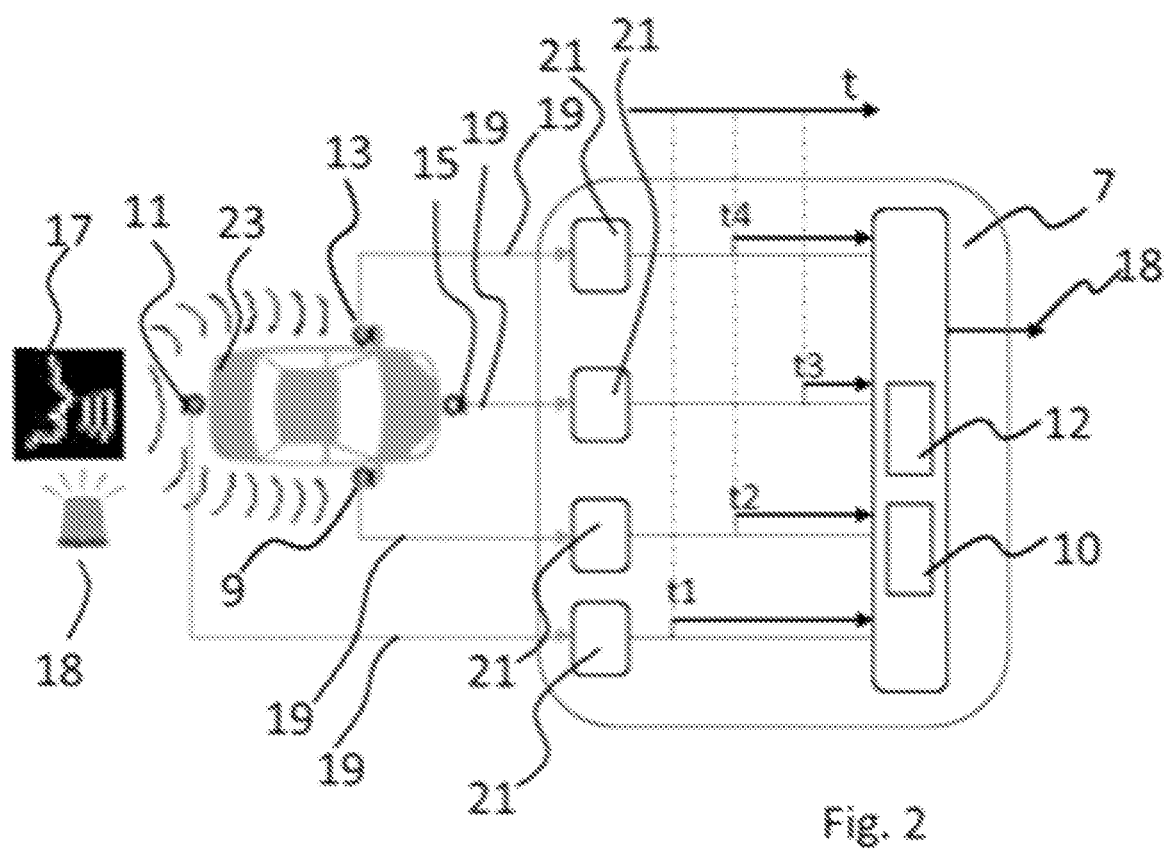
Figure 3:
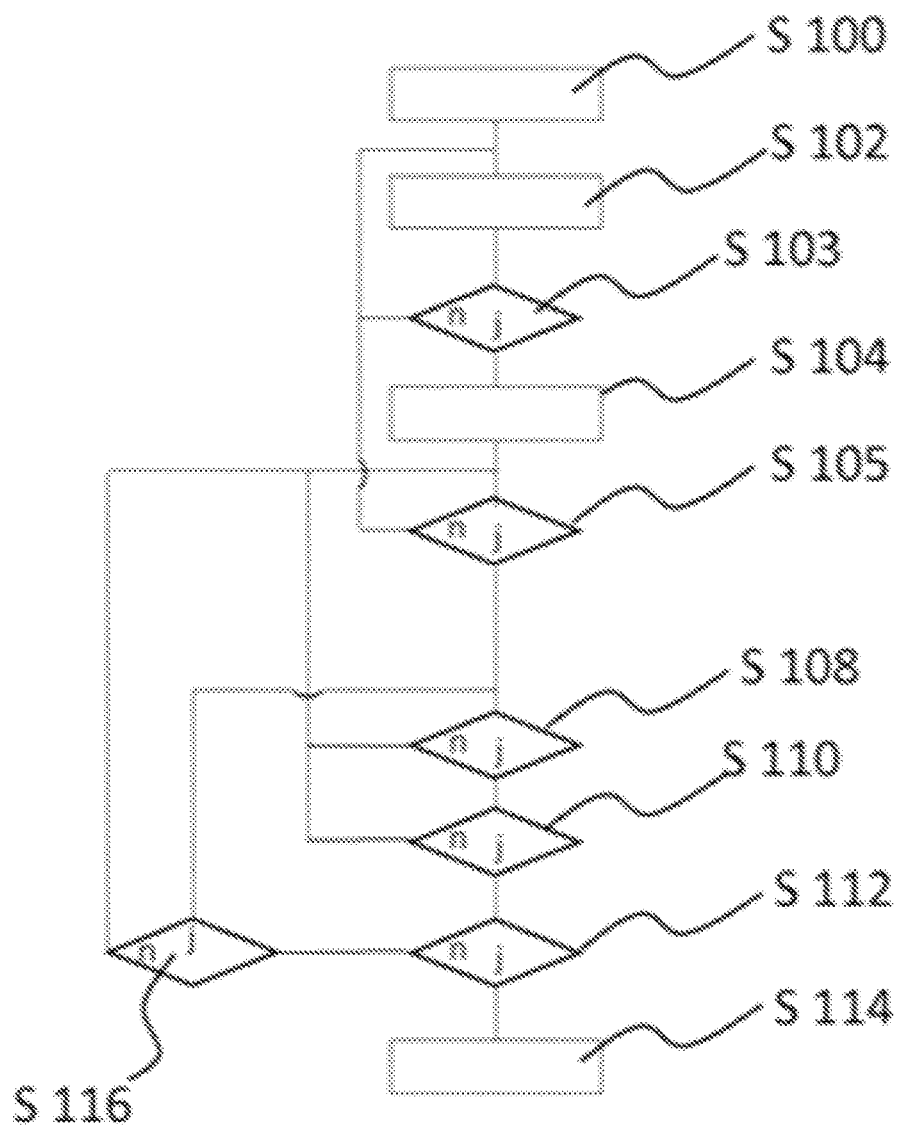

In the drawings:

FIG. 1 shows a motor vehicle with microphones arranged on a number of sides, FIG. 2 shows a method for determining the position of a user in the case of a motor vehicle according to FIG. 1, and FIG. 3 shows a flow chart for carrying out a method for processing sound with a motor vehicle according to FIG. 1.

DETAILED DESCRIPTION

FIG. 1 shows a motor vehicle 1, which is designed to process sound from outside. The motor vehicle 1 has a means 3 that recognizes a user on the basis of a mobile device 5 carried within a defined radius of, for example, 5 m. The mobile device 5 can be a smartphone or a vehicle key, for example. The means 3 receives an identifier transmitted by the mobile device 3. The means 3 is designed as a locking control unit, for example, and is referred to as such hereinafter. The identifier can be transmitted automatically or in a manner initiated by the user by operating the mobile device.

The locking control unit 3 is connected to a speech control unit 7, the speech control unit 7 is further connected to four microphones 9, 11, 13, 15, which are located in both side mirrors and at the front and rear of the vehicle 1. Furthermore, speech control unit 7 is connected to loudspeakers 9a, 11a, 13a, 15a for communication with a user 17. The loudspeakers 9a, 11a, 13a, 15a are preferably located on the sides of the vehicle having the microphones 9, 11, 13, 15.

As soon as the locking control unit 3 has detected the vehicle key 5 in the vicinity of the vehicle 1, this information is transmitted from the locking control unit 3 to the speech control unit 7, whereupon the speech control unit 7 boots up from a passive state, i.e., from a switched-off state or a sleep mode, to an operational state. In the operational state, the speech control unit 7 is ready to receive and process electrical signals from the microphones 9, 11, 13, 15 caused by sound. As shown in FIG. 2, the speech control unit 7 comprises a speech detector 21 to distinguish between speech and other sounds in the surrounding environment. In addition, the speech control unit 9 comprises a speech biometrics module 10, which carries out an analysis and classification of voice characteristics. The speech biometrics module 10 evaluates the voice of the user 17 and compares the voice characteristics with patterns previously stored in the speech biometrics module 10. The speech biometrics module 10 can thus determine whether or not the voice corresponds to a stored pattern. A speech analysis module 12 evaluates a recognized speech input and determines a signal 18 to an actuator that corresponds to the recognized command. In the following description, the speech detector 21, the speech biometrics module 10 and the speech analysis module 12 are seen as part of the speech control unit 7 and are included the term speech control unit 7. The speech control unit 7 also recognizes speech inputs made by a user, and the speech recognition is performed onboard, i.e., in the vehicle itself without the involvement of external servers, so that the speech control unit 7 is also functional in underground car parks without Internet reception.

As shown in FIG. 2, the electrical signals from the microphones 9, 11, 13, 15 are each fed via a signal line 19 to the speech detector 21 of speech control unit 7. The loudspeakers 9a, 11a, 13a, 15a shown in FIG. 1 are also connected to the speech control unit; for the sake of clarity, this has been omitted from the representation in FIG. 2.

As soon as the speech control unit 7 has identified the electrical signals of the microphones 9, 11, 13, 15 as the voice of a user 17 by means of the signal detectors 21, the signals are evaluated by means of the speech biometrics module 10 and the speech analysis module 12. Furthermore, the speech control unit 7 determines a time offset of the electrical signals, which is caused by the different distance of the speaking user 17 from the microphones 9, 11, 13, 15. In the present case, the user 17 is at the rear of the vehicle in the area of the luggage compartment 23. The sound signals of a speech input by the user 17 are received by the microphones 9, 11, 13, 15 and converted into electrical signals. The time difference of the impinging of the sound signals on the microphones 9, 11, 13, 15 is determined from the time of the occurrence t1, t2, t3, t4 of the electrical signals. With reference to a time axis t, in the present case the electrical signal of the microphone 11 occurs at the earliest time t1, the electrical signal of the microphones 9, 13 occur simultaneously at a time t2 and t4 later than t1, and the electrical signal of the microphone 15 occurs as the latest signal. The times t1, t2, t3, t4 determined by the speech control unit 7 are used to determine the location of the user 17. Based on the signals from the microphones 9, 13 located in the wing mirrors occurring at the same times t2 and t4, the speech control unit 7 determines that the user 17 is positioned symmetrically relative to the microphones 9, 13. In addition, on the basis of the times t1 and t3, the speech control unit 7 determines that the user 17 is closest to microphone 11 and furthest away from the microphone 15. On the basis of the times t1, t2, t3, t4, the position of the user 17 can be determined to be in the middle of the rear of the vehicle. By evaluating the times of occurrence of the microphone signals correspondingly, any location of the vehicle user 17 within a 360 degree radius of vehicle 1 can be determined.

When the location of user 17 is determined, the microphones 9, 13, 15 are switched off and only the microphone 11 is selected for further speech input. The speech control unit 7 is further configured to communicate with the user 7. For this purpose, loudspeakers 9a, 11a, 13a, 15a are assigned to each microphone 9, 11, 13, 15, as shown in FIG. 1, by means of which loudspeakers, for example, it is requested that a command be repeated in the event of it not being understood. When the location of the user 17 is detected, only the loudspeaker 9a, 11a, 13a, 15a closest to the user 17 is used in accordance with the microphone selection; further loudspeakers are switched off.

A command transmitted by the speech control unit 7 through the speech input of the user 7 is forwarded to an actuator in the context of the user's location. For example, the speech input "open" determines that a door or the luggage compartment should be opened. In the context of the location of the user 17 at the rear of the vehicle, it is defined that the luggage compartment is to be opened, whereupon the signal is sent to an actuator to open the luggage compartment. In the context of the application, "actuator" means vehicle fittings such as control elements for the movement of components, microphones, and loudspeakers, but also other control devices designed to perform functions.

The speech dialogue system 7 is further designed to communicate with the user 7. For this purpose, loudspeakers 9a, 11a, 13a, 15a are assigned to each microphone (not shown) 9, 11, 13, 15, by means of which loudspeakers, for example, a greeting voice asks for information or for a command to be repeated if it has not been understood.

FIG. 3 shows the steps of processing sound from outside the vehicle with a motor vehicle 1 described in the previous figures. According to S100, a user 17 is recognized on the basis of a mobile device 5 carried by the user. Once the user 17 is recognized, a speech control system 7 is set to an operational state according to S102. The operational state is indicated to the user by an announcement via loudspeakers 9a, 11a, 13a, 15a and/or optical signals. In this step, a keyword from the user 17 is expected. If in step S103 a sound is recognized as a speech input in the form of a keyword, the speech control system 7 in step S104 issues a prompt to a user 7 via loudspeakers 9a, 11a, 13a, 15a to input a wish or command. In step 104, the electrical signals transmitted by the microphones 9, 11, 13, 15 and caused by the keyword are further analyzed in the speech control unit 7 with regard to their time of occurrence, and a location of the user 17 is determined. If the location is known, only electrical signals from the microphone 9, 11, 13, 15 closest to the user 17 are used for further speech inputs by the user 17 and only those from the loudspeaker 9a, 11a, 13a, 15a closest to the user 17 are used for speech output. Furthermore, depending on the distance of the user from the vehicle 1 and the ambient noise, the volume is adjusted: the further away the user is from the vehicle and the greater the ambient noise, the louder the output.

In step S105, the system is ready to receive commands. If no keyword is recognized in step S103 or no command is received in step S105 within a specified time, the speech control system 7 returns to the operationally ready state after step S102.

If a command is input in step S105, a received input is analyzed in step S108. If the input is not recognizable as a speech input but merely as a sound effect from the surrounding environment, the speech control system 7 returns to the reception-ready state in step 105. If the input is detected as a speech input due to the energy level and the recognition of voice characteristics, then in step S110 it is checked whether the voice with which the speech input was made matches a voice pattern stored in the speech control system 7. If the speech input voice does not match one of the stored voice patterns, then the user is informed via loudspeakers 9a, 11a, 13a, 15a, for example, that he is not authorized and the speech control system returns to the reception-ready state in step 105.

If the voice of the speech input matches a stored voice pattern, it is checked in step 112 whether the speech input corresponds to a speech command. A speech command can be determined by using prior-art methods such as natural speech recognition or by comparing an input with commands stored in the speech control unit 7. If the speech input has been recognized and understood as a command, then in step S114 a signal 18 assigned to this command is transmitted to a vehicle device for execution, taking into account the location of the user 17. If the user 17 is standing in front of the driver's door, for example, a speech input recognized as a command such as "open" causes an actuator to be activated to open the driver's door. All networked vehicle equipment which can be activated in particular via CAN bus and/or relay card, for example doors, windows, blackout equipment, luggage compartment lid, sunroof, ventilation, user-related seat adjustment etc., can be activated. A command can also cause the acoustic output via loudspeakers 9a, 11a, 13a, 15a of the vehicle data available in the instrument cluster, such as fuel or battery level, mileage etc.

If the speech input is not understood in step S112, a speech dialogue with the user 17 is carried out in step S116, with the user 17 being requested to make a new input. If a new speech input is made within a specified time window, it is analyzed in step S108; if no speech input is made within the specified time window, the speech control system returns to the reception-ready state in step 105.

In an alternative embodiment (not shown), a check with a stored voice pattern according to step S110 is already carried out after successful input of the keyword in step S103. If the voice pattern stored in the speech control unit 7 matches the voice pattern stored in the speech control unit 7, the check continues according to step 104. If there is no match, the user 17 is informed similarly to step S110 that he is not authorized, and the speech control system returns to the operational state after step S102.

In a further embodiment, the speech control unit 7 recognizes that a sound acting on the vehicle is a special signal 18 of an emergency vehicle, see FIG. 2. Similar to the determination of the location of a vehicle user 17, the location of an emergency vehicle (not shown) is determined. The location of the emergency vehicle in relation to the motor vehicle 1 is shown to a driver of the vehicle on a display (not shown). Alternatively, or additionally, the direction of the approaching emergency vehicle can be indicated to a user by acoustic and/or haptic signals in the vehicle.

Although the invention has been illustrated and explained in detail by preferred embodiments, the invention is not limited by the examples disclosed, and other variations can be derived by a person skilled in the art without departing from the scope of protection of the invention. It is therefore clear that there is a wide range of possible variations. It is also clear that the embodiments given are really only examples, which are not in any way intended to limit the scope of protection, the possible applications or the configuration of the invention. Rather, the description above and the description of the drawings enable a person skilled in the art to implement the exemplary embodiments in a specific way, wherein the person skilled in the art, being aware of the disclosed inventive concept, is able to make various changes, for example with regard to the function or the arrangement of individual elements mentioned in an exemplary embodiment, without departing from the scope of protection defined by the claims and their legal equivalents, such as further explanations in the description.

The invention claimed is:

1. A motor vehicle, comprising
   means for identifying a user based on a mobile device carried by the user;
   a plurality of microphones oriented in different directions on different sides of the motor vehicle, wherein the plurality of microphones are arranged so that the plurality of microphones capture sound outside of the motor vehicle;
   a plurality of loudspeakers directed into an exterior environment of the motor vehicle; and
   a speech control unit, wherein once the user has been identified from outside of the motor vehicle, the plurality of microphones convert sound waves into electrical signals and transmit the electrical signal to the speech control unit,
   wherein the speech control unit determines a position of the user relative to the motor vehicle based on differences in propagation times of the electrical signals by different distances of the user from each of the plurality of microphones,
   wherein the speech control unit is connected to the plurality of loudspeakers to produce a speech output in the exterior environment of the motor vehicle, wherein the speech output is provided only via a loudspeaker or loudspeakers of the plurality of loudspeakers that is/are closest to the determined position of the user, and
   wherein the speech control unit determines, by evaluating the electrical signals transmitted to the speech control unit, whether the sound waves are assigned to a speech input by the user.

2. The motor vehicle of claim 1, wherein the speech control unit changes, depending on a distance between the determined position of the user and the motor vehicle or depending upon ambient noise, a volume of the speech output that is output via the loudspeaker or loudspeakers of the plurality of loudspeakers that is/are closest to the determined position of the user.

3. The motor vehicle of claim 1, wherein the speech control unit recognizes a command transmitted by the speech input and effects a vehicle function based on the determined position of the user.

4. The motor vehicle of claim 1, wherein the speech control unit, after determining the position of the user, only evaluates signals from a microphone of the plurality of microphones that is closest to the user.

5. The motor vehicle of claim 1, wherein the speech control unit determines whether a speech input via at least one of the plurality of microphones corresponds to a stored voice pattern.

6. The motor vehicle of claim 1, wherein the speech control unit boots up from an idle state to an operational state upon recognition of the user by the means for identifying the user, so that the electrical signals generated by the plurality of microphones can be evaluated.

7. The motor vehicle of claim 1, wherein the plurality of microphones or the plurality of loudspeakers are located in front, rear, and both side areas of the motor vehicle respectively.

8. The motor vehicle of claim 7, wherein microphones of the plurality of microphones that are located in the side areas or loudspeakers of the plurality of loudspeakers are located in side mirrors of the motor vehicle.

9. A method for processing sound from outside a vehicle, the method comprising:
recognizing a user;
converting, once the user is recognized, sound waves acting on the vehicle into electrical signals using means a plurality of microphones directed into an exterior environment of the vehicle;
transmitting the electrical signals to a speech control unit;
evaluating, by the speech control unit, the signals transmitted by the plurality of microphones;
determining a position of the user relative to the vehicle based on differences in propagation time of the electrical signals caused by different distances of the user from each of the plurality of microphones; and
communicating with the user via a plurality of loudspeakers directed into the exterior environment of the vehicle, wherein the plurality of loudspeakers are connected to the speech control unit, and only a loudspeaker or loudspeakers of the plurality of loudspeakers that is/are closest to the user are activated for speech output for the communicating with the user.

10. The motor vehicle of claim 1, wherein the speech control unit is configured to process speech from outside of the vehicle and is independent of any speech input system present in a passenger compartment of the vehicle.

11. The motor vehicle of claim 1, wherein the speech control unit is configured to change a frequency of the speech output based on ambient noise.

12. The motor vehicle of claim 1, wherein the speech control unit is configured to change a volume of the speech output based on ambient noise.

13. The method of claim 9, wherein the speech control unit processes speech from outside of the vehicle and is independent of any speech input system present in a passenger compartment of the vehicle.

14. The method of claim 9, wherein the speech control unit changes a frequency of the speech output based on ambient noise.

15. The method of claim 9, wherein the speech control unit changes a volume of the speech output based on ambient noise.

* * * * *